United States Patent
Chen et al.

(10) Patent No.: US 10,234,619 B2
(45) Date of Patent: Mar. 19, 2019

(54) BACKLIGHT MODULE FOR LIGHT-EMITTING KEYBOARD, LIGHT-EMITTING KEYBOARD USING SAME

(71) Applicant: CHICONY POWER TECHNOLOGY CO., LTD., New Taipei (TW)

(72) Inventors: Yi-Wen Chen, New Taipei (TW); Wei-Hao Cheng, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 40 days.

(21) Appl. No.: 15/483,512

(22) Filed: Apr. 10, 2017

(65) Prior Publication Data

US 2018/0149797 A1 May 31, 2018

(30) Foreign Application Priority Data

Nov. 28, 2016 (TW) .............................. 105139100 A

(51) Int. Cl.
F21V 8/00 (2006.01)
G06F 3/02 (2006.01)

(52) U.S. Cl.
CPC ......... G02B 6/0055 (2013.01); G06F 3/0202 (2013.01); G02B 6/0058 (2013.01)

(58) Field of Classification Search
CPC .... G02B 6/0055; G02B 6/0058; G06F 3/0202
See application file for complete search history.

(56) References Cited

U.S. PATENT DOCUMENTS 7,086,768 B2 * 8/2006 Suwa .................... G06F 3/0202
362/23.16
8,419,263 B2 * 4/2013 Wang ................... G02B 6/0061
362/615

(Continued)

FOREIGN PATENT DOCUMENTS

| CN | 102565920 A | 7/2012 |
| CN | 103000424 A | 3/2013 |
| CN | 206505860 U | 9/2017 |

*Primary Examiner* — Sean P Gramling
*Assistant Examiner* — Naomi M Wolford
(74) *Attorney, Agent, or Firm* — Muncy, Geissler, Olds & Lowe, P.C.

(57) ABSTRACT

A backlight module for light-emitting keyboard includes light guide plate having reflective surface, opposing light-emitting surface and plurality of recessed dots located on reflective surface to create optical path of continuous wave-like reflecting portion for facing toward key switch unit in light-emitting keyboard. The spacing between the centers of each two adjacent recessed dots is smaller than or equal to diameter of one single recessed dot. The continuous wave-like reflecting portion exhibits a continuous ring-shaped pattern formed of a series of ring-shaped square waves, triangular waves, sawtooth waves or sine waves and consisting of at least one different cycle waveforms having varying cycle periods, amplitudes or peak-to-peak values that are interleaved in regular or irregular manner. The invention allows adjustment of the frequency and equivalent length of the optical path of the continuous ring-shaped pattern to effectively enhance uniform brightness distribution, improving the average brightness of the light guide plate.

10 Claims, 12 Drawing Sheets

(56) References Cited

U.S. PATENT DOCUMENTS

2011/0228556 A1 9/2011 Wang et al.
2012/0229389 A1* 9/2012 Nishino ............... G06F 3/0202
　　　　　　　　　　　　　　　　　　　345/170

* cited by examiner

BACKLIGHT MODULE FOR LIGHT-EMITTING KEYBOARD, LIGHT-EMITTING KEYBOARD USING SAME

BACKGROUND OF THE INVENTION

This application claims the priority benefit of Taiwan patent application number 105139100, filed on Nov. 28, 2016.

1. FIELD OF THE INVENTION

The present invention relates to keyboard technology and more particularly, to a backlight module for light-emitting keyboard and a light-emitting keyboard using the backlight module, wherein the light guide plate has a plurality of recessed dots arranged on a reflective surface to create an optical path of a continuous wave-like reflecting portion for facing toward a key switch unit in a light-emitting keyboard, improving the average brightness of the light guide plate.

2. DESCRIPTION OF THE RELATED ART

With fast development of modern electronic technology and information industry, the electronic product design trend is moving toward the development of creating electronic products having light, thin, short, small and high power characteristics. Nowadays, computers, laptops, mobile Internet devices (MID), smart phones, tablet PCs, have become the indispensable electronic products of modern people in their daily lives or work. Input devices such as mouse, keyboard, etc. have been widely used for communication between users and electronic products. Among the various input devices, keyboard is most convenient for text, digital or instruction input operation, and can significantly enhance practicability.

Further, in order for enabling the user to clearly see the symbol on each key switch in low light conditions, some keyboard manufacturers introduce light guide plate and light source technologies into keyboards, creating backlit keyboards. In a backlit keyboard, the light emitted by the backlight module can be projected onto the back side of the key cap of every key switch, providing a backlight effect. Thus, the user can see clearly the character symbol on the key cap of every key switch, facilitating operation. Commercial backlit keyboards commonly consist of a keyboard module and a backlight module. The backlight module comprises a light guide plate, a light source located at one side of the light guide plate with light-emitting diodes thereof facing toward the light guide plate for enabling emitted light to be uniformly distributed through the light guide plate and guided toward a predetermined direction, a reflective sheet mounted at the bottom side of the light guide plate for reflecting light back into the light guide plate, and a shading sheet mounted on the top side of the light guide plate and providing light transmissive portions facing toward the respective key switches of the keyboard module for the passing of the emitted light from the light guide plate toward the key caps of the respective key switches of the keyboard module to provide backlight illumination.

However, backlight modules can be configured to provide an edge type light source or a direct type light source. The use of an edge type light source facilitates the implementation of a low profile design. Therefore, edge type light sources are widely used in backlight modules. However, when the emitted light of an edge type light source goes from a front side of a light guide plate toward a rear side thereof, the brightness of the emitted light will be attenuated gradually, resulting in insufficient brightness of illumination around the character symbols on the key switches corresponding to the rear side of the light guide plate. In order to eliminate the problems of uneven distribution of light and insufficient brightness, light guide plates with microstructures on the bottom or reflective surface thereof are created. These microstructures are capable of changing the light path, enabling the light guide plate to concentrically guide the light toward each key switch.

Currently, the dot microstructure in each dot block of a conventional light guide plate is of a discrete design that achieves adjustment of optical extraction by means of dot density=number of dots/unit area. More particularly, the area of the light guide plate far from the light source has a relatively longer light transmission distance, the energy density in this area is relatively lower, thus, the dot density in the area far from the light source must be increased to improve the optical extraction rate. The discrete microstructure pattern on the male die is transferred to the surface of the light guide plate by surface pressure contact subject to application of a hot (flat) pressure or hot rolling process to give predetermined temperature and pressure to the light guide plate.

However, due to the limitations of the material or machine used, the molding temperature (for example, 165° C.) and pressure (for example, 60 KG) at the high dot density area of the light guide plate cannot be increased, leading to an incomplete transcription problem. The "transcription rate" is often used to define whether or not the transcription has reached the desired specification. The dot density of discrete microstructures near the light source is low, thus the transcription rate can be as high as 90~95%; however, the dot density of discrete microstructures far from the light source is high, thus the transcription rate will be lowered to about 50~60% where the limit of the optical extraction of the discrete structure pattern of the light guide plate has been reached. Therefore, the conventional technique of transferring discrete microstructure patterns by means of surface pressure contact can no longer increase the brightness of the light guide plate by means of increasing the dot density. Thus, the light-emitting surface of a conventional light guide plate has the drawback of uneven brightness. An improvement in this regard is needed.

SUMMARY OF THE INVENTION

The present invention has been accomplished under the circumstances in view. It is therefore the main object of the present invention to provide a backlight module for light-emitting keyboard, which can define the configuration of the continuous series of waves of the continuous wave pattern of the optical path to effectively enhance the optical extraction intensity so as to increase the average brightness of the light guide plate for practical use in a light-emitting keyboard.

To achieve this and other objects of the present invention, a backlight module comprises a light guide plate. The light guide plate comprises a reflective surface, an opposing light-emitting surface, and a plurality of recessed dots located on the reflective surface to create an optical path of a continuous wave-like reflecting portion for facing toward a key switch unit in a light-emitting keyboard. The spacing between the centers of each two adjacent recessed dots is smaller or equal to the diameter of one single recessed dot. The continuous wave-like reflecting portion exhibits a continuous ring-shaped pattern formed of a series of ring-shaped square waves, triangular waves, sawtooth waves or sine waves and consisting of different cycle waveforms having varying cycle periods, amplitudes or peak-to-peak values that are interleaved in a regular or irregular manner.

The optical path design of the continuous ring-shaped pattern of the continuous wave-like reflecting portion of the invention allows adjustment of the density and equivalent length of the continuous waves of the continuous ring-shaped pattern by means of adjustment of the frequency, and thus, the brightness of the light-emitting surface of the light guide plate can be effectively and uniformly distributed, improving the average brightness of the light guide plate.

Further, the optical path of the pattern of the reflecting portion of the light guide plate is a complex wave formed of a series of waves that allows transfer of microstructure patterns from the mold to the light guide plate by line pressure contact instead of surface pressure contact. This method greatly increases the transcription rate without scarifying dot density, and thus, the invention greatly improves the light guide plate yield rate and significantly reduces the light guide plate manufacturing cost.

It is another object of the present invention to provide a light-emitting keyboard using the aforesaid backlight module. The light-emitting keyboard comprises the backlight module and a key switch unit. The backlight module further comprises a reflective sheet mounted on the reflective surface of the light guide plate, a shading sheet mounted on the light-emitting surface of the light guide plate, and a light source module disposed adjacent to the light guide plate and adapted for emitting light into the light guide plate. The key switch unit is mounted on the backlight module, comprising a bottom plate, a membrane circuit board, a key cap and a coupling device. The bottom plate comprises at least one broken hole facing toward the key cap. The membrane circuit board is mounted between the bottom plate and the key cap. The coupling device is coupled between the key cap and the bottom plate and adapted for moving the key cap up and down relative to the bottom plate. The reflecting portion of the light guide plate is adapted for reflecting light from the backlight module through the at least one broken hole toward the key cap.

The reflecting portion of the light guide plate exhibits a continuous ring-shaped pattern. The continuous ring-shaped pattern of the reflecting portion of the light guide plate is a complex wave formed of a series of waves, defining at least one opening. Further, each individual wave comprises at least two straight line segments, a straight turning line segment connected between respective one ends of each two adjacent straight line segments, and a gap defined between each two adjacent straight line segments opposite to one respective straight turning line segment. Further, the bottom plate of the key switch unit comprises at least one broken hole facing toward the key cap. The optical path of the continuous ring-shaped pattern of the reflecting portion goes through the at least one broken hole. Thus, the equivalent length of the continuous ring-shaped pattern of the reflecting portion can be changed according to the distance from the light source module, i.e., the equivalent length of a continuous ring-shaped pattern disposed near the light source module is shorter than the equivalent length of a continuous ring-shaped pattern disposed far from the light source module, thus the brightness of the area of the light guide plate far from the light source module can be relatively increased, enabling the brightness of the light-emitting surface of light guide plate to be uniformly distributed.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
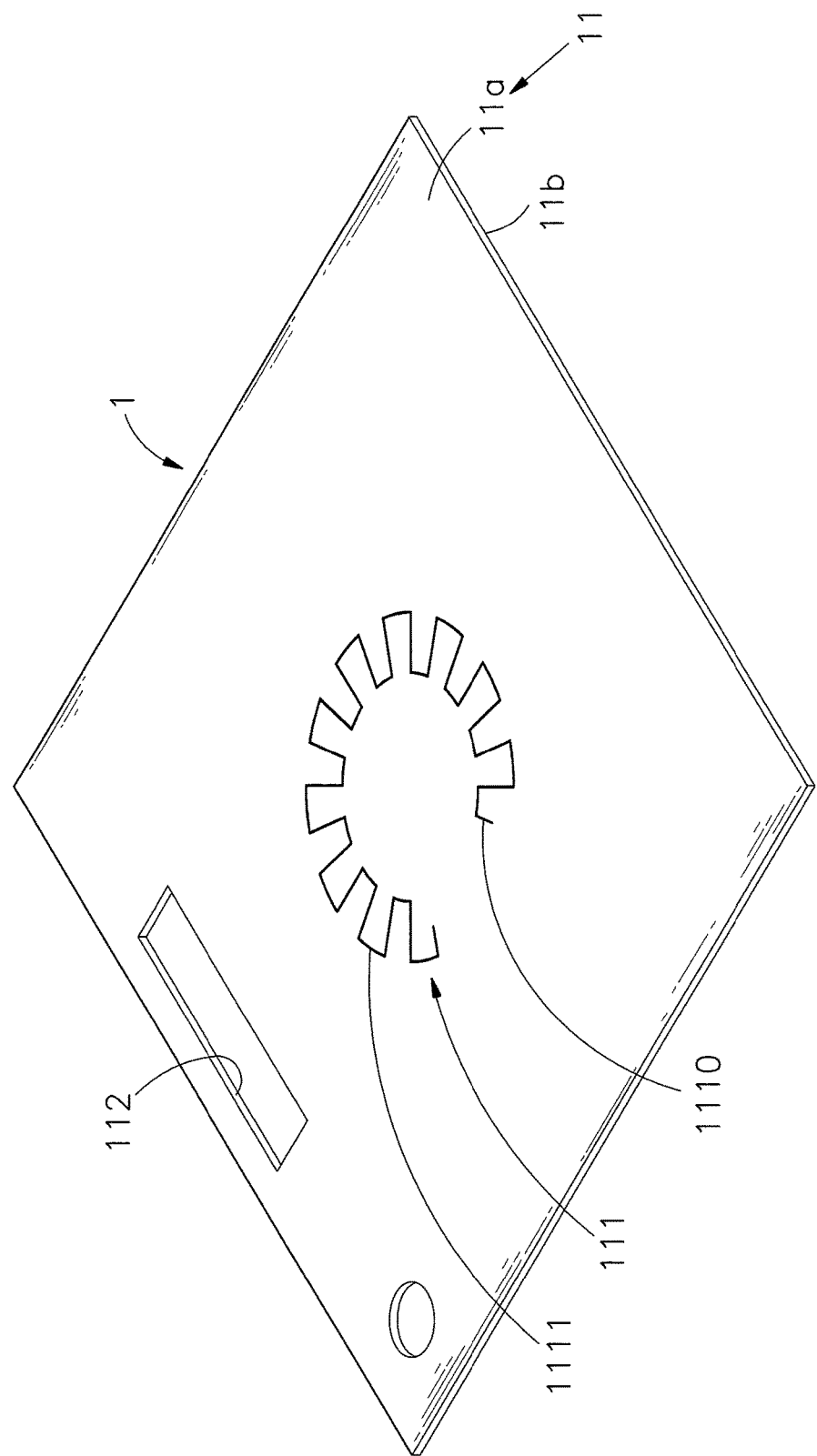
FIG. 1 is an elevational view of a light-guiding layer of a backlight module of a keyboard backlight module assembly in accordance with the present invention.

Referring to FIGS. 1-4, an elevational view of a light guide plate of a backlight module in accordance with the present invention, an enlarged view of a part of the reflecting portion of the light guide plate, an enlarged view of a part of an alternate form of the reflecting portion of the light guide plate and a schematic drawing illustrating various different continuous ring-shaped patterns of the reflecting portion of the light guide plate are shown. As illustrated, a backlight module 1 comprises a light guide plate 11. The light guide plate 11 comprises a reflective surface 11a, a light-emitting surface 11b opposite to the reflective surface 11a, and a plurality of recessed dots 110 located on the reflective surface 11a to constitute an optical path of a continuous wave-like reflecting portion 111 that faces toward a key switch unit 2 after installation of the backlight module 1 in a light-emitting keyboard (see FIGS. 5-7). Further, a spacing S between the centers of each two adjacent recessed dots 110 is not larger than (i.e., is smaller than or equal to) a diameter d of one single recessed dot 110. The continuous wave-like reflecting portion 111 exhibits a continuous ring-shaped pattern 1111 formed of a series of ring-shaped square waves, triangular waves, sawtooth waves or sine waves. Further, the continuous ring-shaped pattern 1111 consists of at least one different cycle waveforms having varying cycle periods, amplitudes or peak-to-peak values that are interleaved in a regular or irregular manner.

Figure 2:
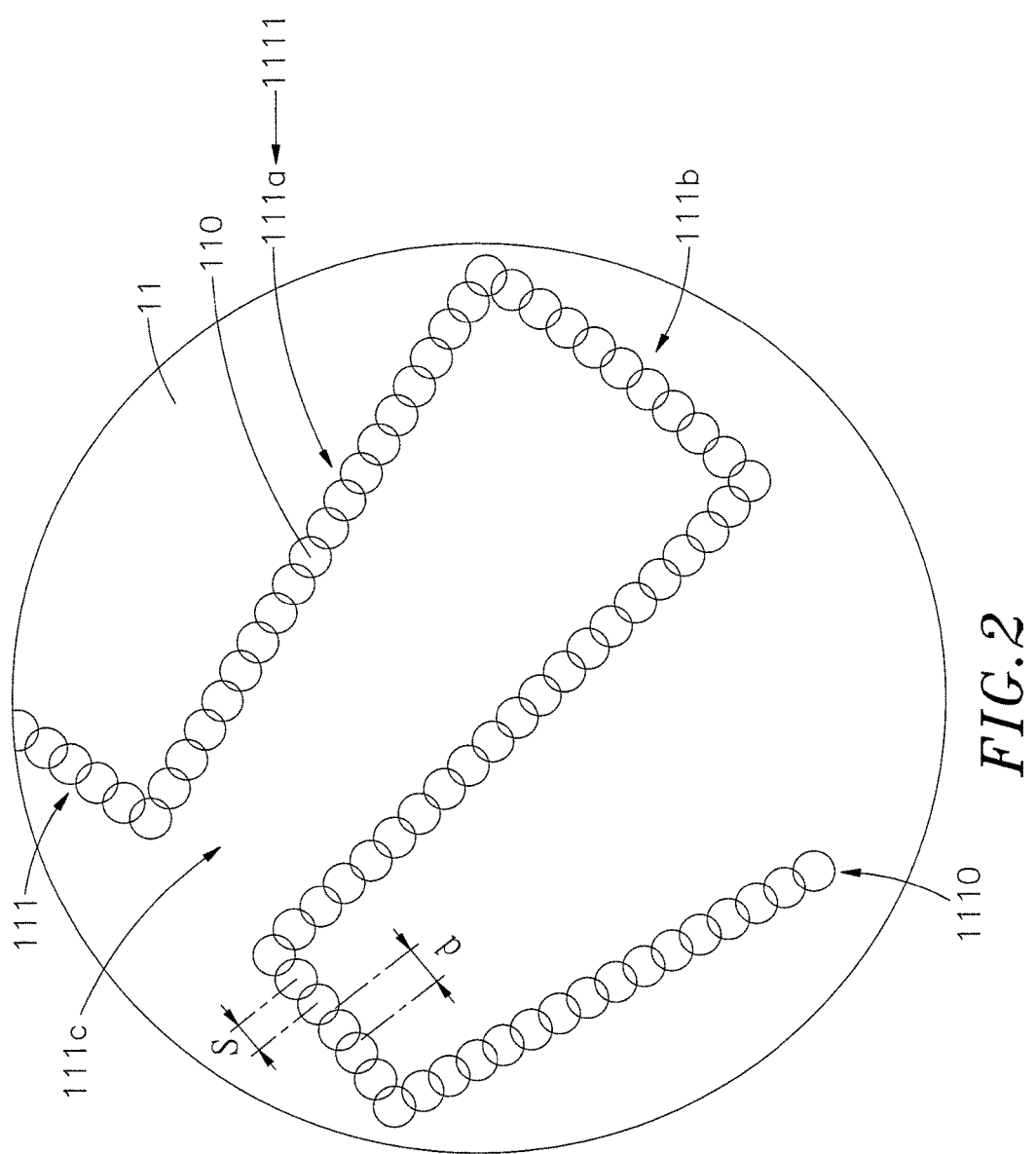
FIG. 2 is an enlarged view of a part of the reflecting portion of the light guide plate of the backlight module in accordance with the present invention.
Figure 3:
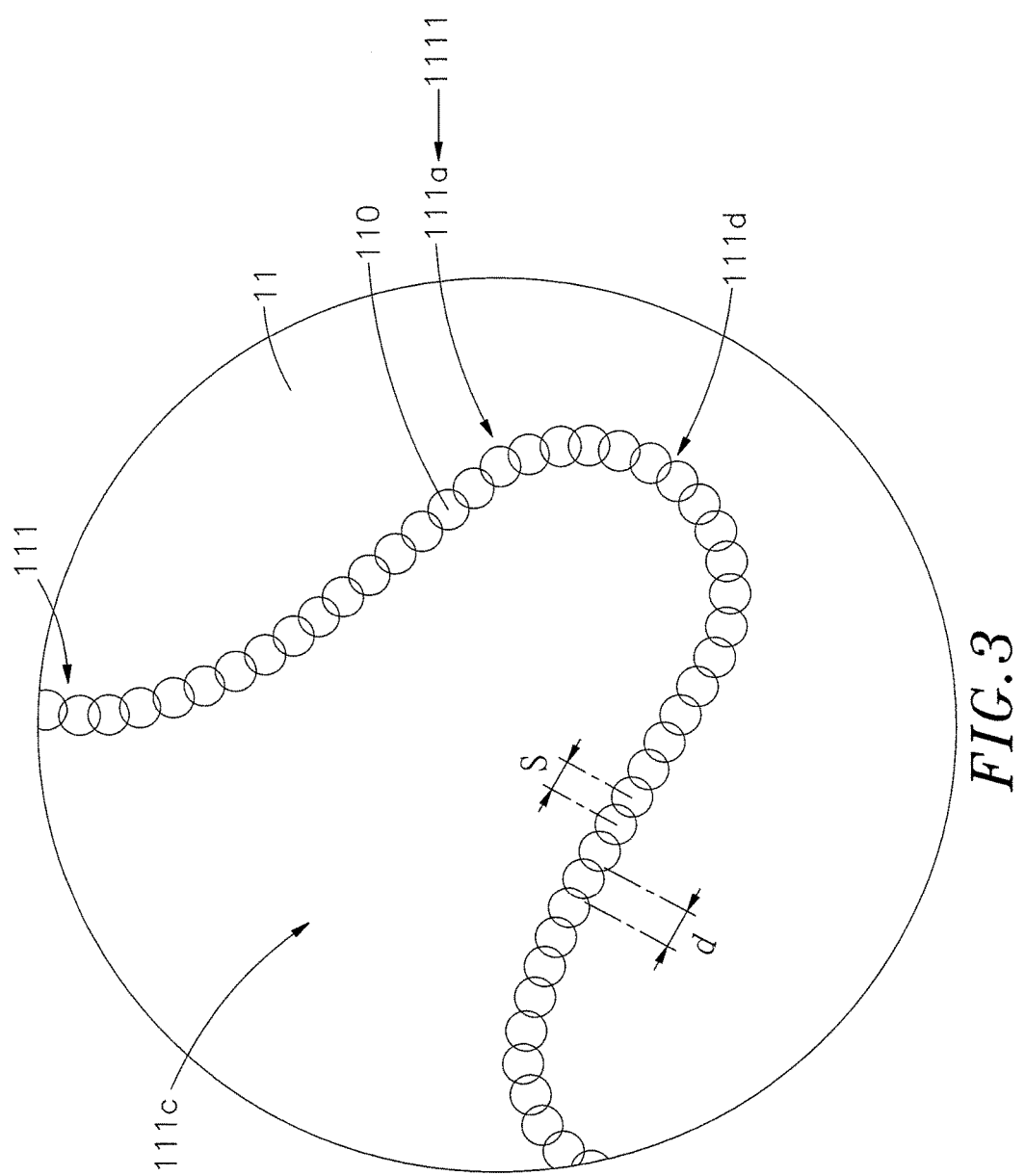
FIG. 3 is an enlarged view of a part of an alternate form of the reflecting portion of the light guide plate of the backlight module in accordance with the present invention.

In one embodiment of the present invention, the continuous ring-shaped pattern 1111 of the reflecting portion 111 of the light guide plate 11 is a complex wave formed of a series of ring-shaped square waves, triangular waves, sawtooth waves or sine waves that are arranged to exhibit a C-shaped, curved, arched, U-shaped, continuous U-shaped, S-shaped or continuous S-shaped profile and defining at least one opening 1110, wherein each individual wave comprises at least two straight line segments 111a, a straight turning line segment 111b connected between respective one ends of each two adjacent straight line segments 111a, and a gap 111e defined between each two adjacent straight line segments 111a opposite to the one respective straight turning line segment 111b (see FIG. 2).

In another embodiment of the present invention, each individual wave of the continuous ring-shaped pattern 1111 comprises at least two straight line segments 111a that can be arranged in a parallel or non-parallel manner, an arched line segment 111d connected between respective one ends of each two adjacent straight line segments 111a, and the gap 111e defined between each two adjacent straight line segments 111a opposite to one respective arched line segment 111d.

The surface of the die core substrate for the aforesaid light guide plate 11 is processed to provide a series of recessed dots by means of laser, mechanical processing or ultra-fine processing, or to provide a series of patterns by lithography and etching process. By means of controlling the distance between each two adjacent recessed dots and enabling the radius of curvature of each turning portion of the continuous line of the series of recessed dots to be greater than or equal to 10 times the radius of each individual recessed dot, each two adjacent straight line segments can be kept in parallel with a predetermined distance maintained therebetween. For example, femtosecond laser technology can be used. When the pulse width is controlled within the order of femtoseconds (fs=$10^{-15}$ s), the thermal effect is very low and the accuracy is better, and the processed recessed dots can be connected into a line segment of low error. Thereafter, the processed die core substrate is put in a female and processed into a sheet-like or roll-like male mold. Thereafter, hot pressing or hot rolling process is employed to give a certain line pressure, creating a line contact and enabling the microstructure pattern of the female mold to be transferred to the reflecting portion 111 of the light guide plate 11. When compared to the discrete microstructure pattern transfer technique of the prior art design using surface pressure contact, the transcription of the continuous line structure design of the light guide plate 11 under the condition of same number of the recessed dots 110 is about ½~1/10 of the time used in the surface pressure processing of the prior art technique. Thus, the transcription rate of the reflecting portion 111 of the light guide plate 11 in accordance with the present invention is significantly improved. Further, the number of recessed dots 110 in the reflecting portion 111 of the light guide plate 11 can be increased according to actual application requirements or the desired optical extraction rate. Thus, increasing the optical extraction rate does not need to scarify the density of the recessed dots 110 due to reduction in transcription rate, and thus, the optical extraction strength can be effectively improved, enabling the brightness of the light-emitting surface 11a of the light guide plate 11 to be uniformly distributed to improve the average brightness of the light guide plate 11. Thus, the invention enhances the practicability and reliability of the light guide plate 11.

Figure 4:
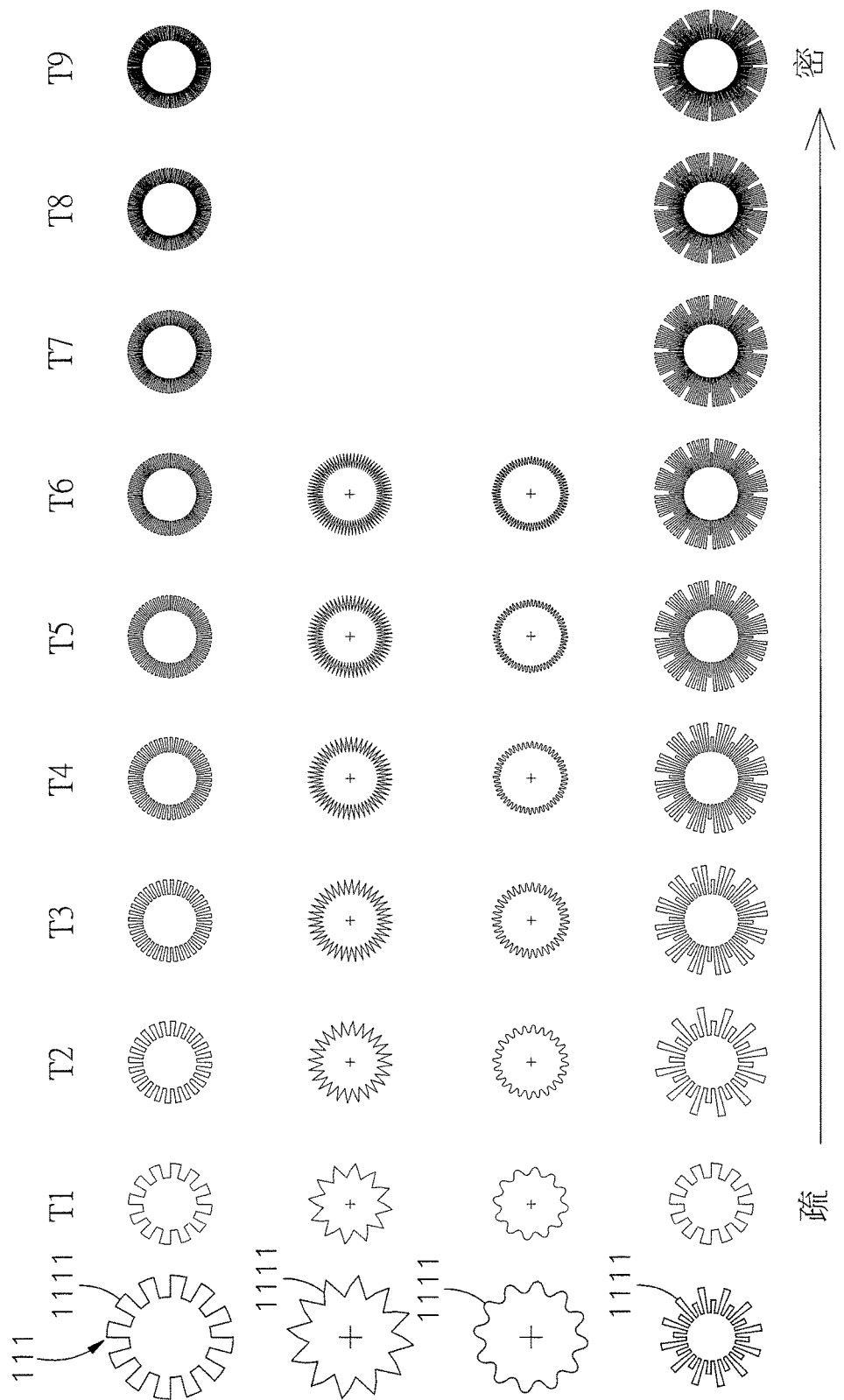
FIG. 4 is schematic drawing illustrating various different continuous ring-shaped patterns of the reflecting portion of the light guide plate of the backlight module in accordance with the present invention

Referring to FIG. 4, the continuous ring-shaped pattern 1111 of the reflecting portion 111 of the light guide plate 11 is a complex wave formed of a series of ring-shaped square waves, triangular waves, sawtooth waves or sine waves. The first (top) row of continuous ring-shaped patterns 1111 shown from left to right in a proper order in FIG. 4 are respectively formed of a series of ring-shaped square waves, having different cycle periods T1~T9 (the time it takes for the waveform to complete a round trip) but equal amplitude. The second row of continuous ring-shaped patterns 1111 are respectively formed of a series of ring-shaped sawtooth waves, having different cycle periods T1~T6. The third row of continuous ring-shaped patterns 1111 are respectively formed of a series of sine waves, having different cycle periods T1~T6. The fourth row of continuous ring-shaped patterns 1111 are respectively formed of a series of ring-shaped square waves with different cycle periods T1~T9, having different cycle periods T1~T6, and different amplitudes (unit amount measured from the waveform average to the peak or valley), peak-to-peak values or valley-to-valley values (difference in peak to valley). In the fourth row of continuous ring-shaped patterns 1111, the number of waveforms is incremented from left to right.

Frequency refers to the number of cycles completed in an internal of time. It is the reciprocal of the period and can be calculated with the equation (f)=(1/T). The higher the frequency (i.e., the shorter the cycle period) of the continuous series of waves of the continuous ring-shaped pattern 1111 is, the higher the density and equivalent length of the continuous series of waves will be. The lower the frequency (i.e., the longer the cycle period) of the continuous series of waves of the continuous ring-shaped pattern 1111 is, the shorter the equivalent length of the continuous series of waves will be. Thus, adjusting the frequency, amplitude and/or peak-to-peak value of the continuous series of waves of the continuous ring-shaped pattern 1111 of the reflecting portion 111 can relatively adjust the density and equivalent length of the continuous series of waves (i.e., the density of the recessed dots 110) to improve the optical extraction rate, controlling uniform brightness distribution of the light guide plate 11 and achieving the purpose of improving the average brightness of the light guide plate 11.

Figure 5:
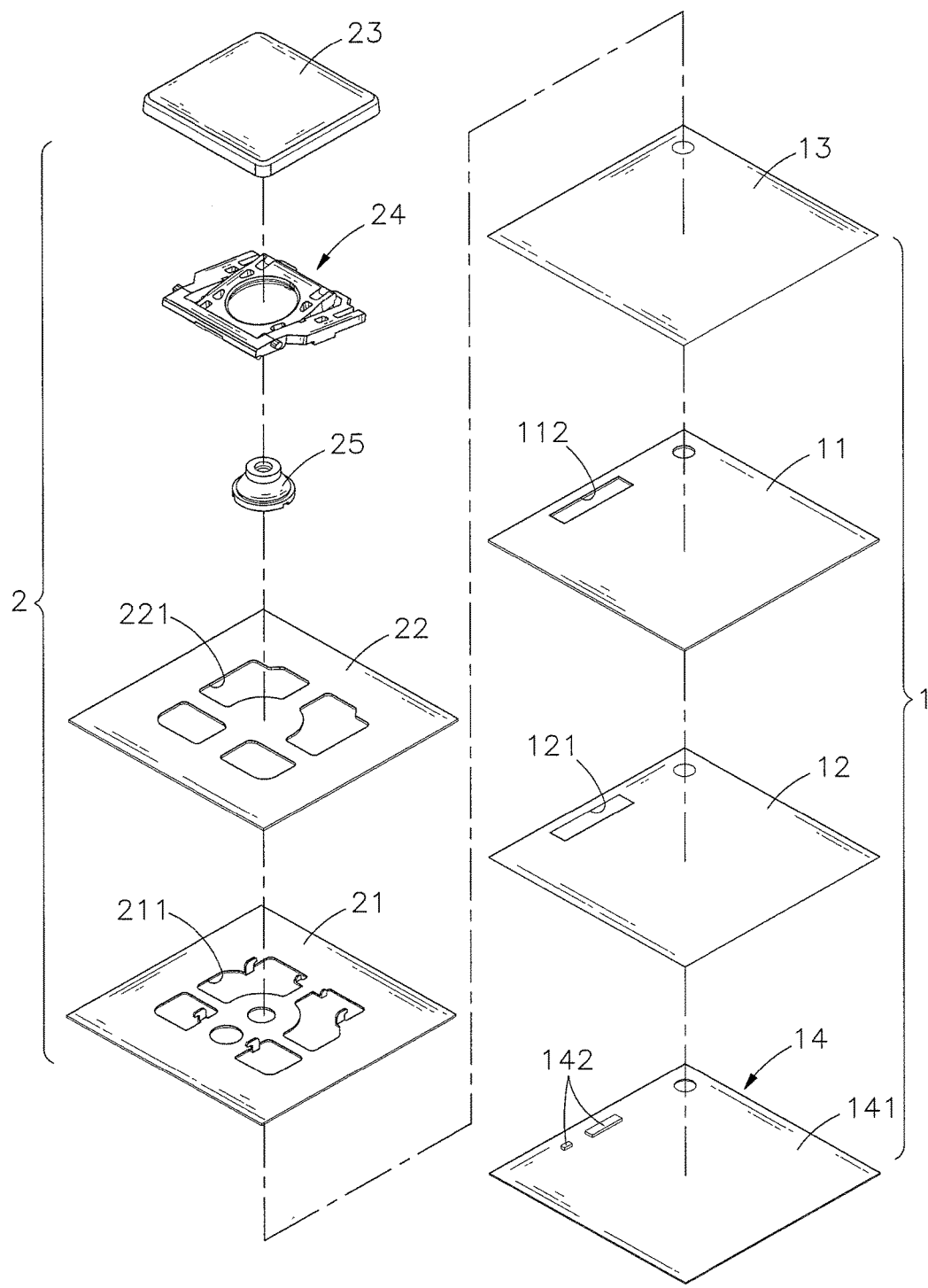
FIG. 5 is an exploded view of a light-emitting keyboard in accordance with the present invention.
Figure 6:
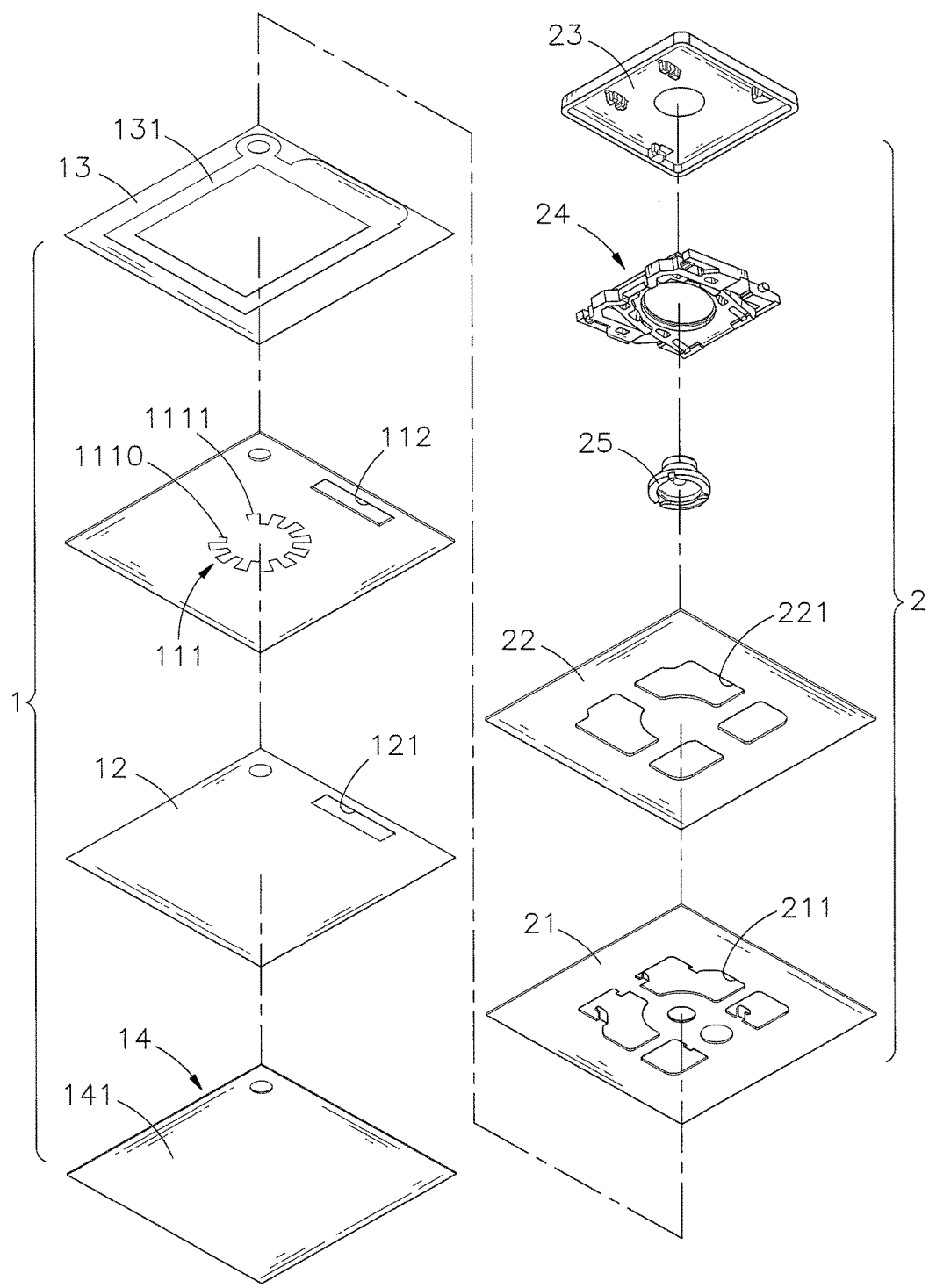
FIG. 6 corresponds to FIG. 5 when viewed from another angle.
Figure 7:
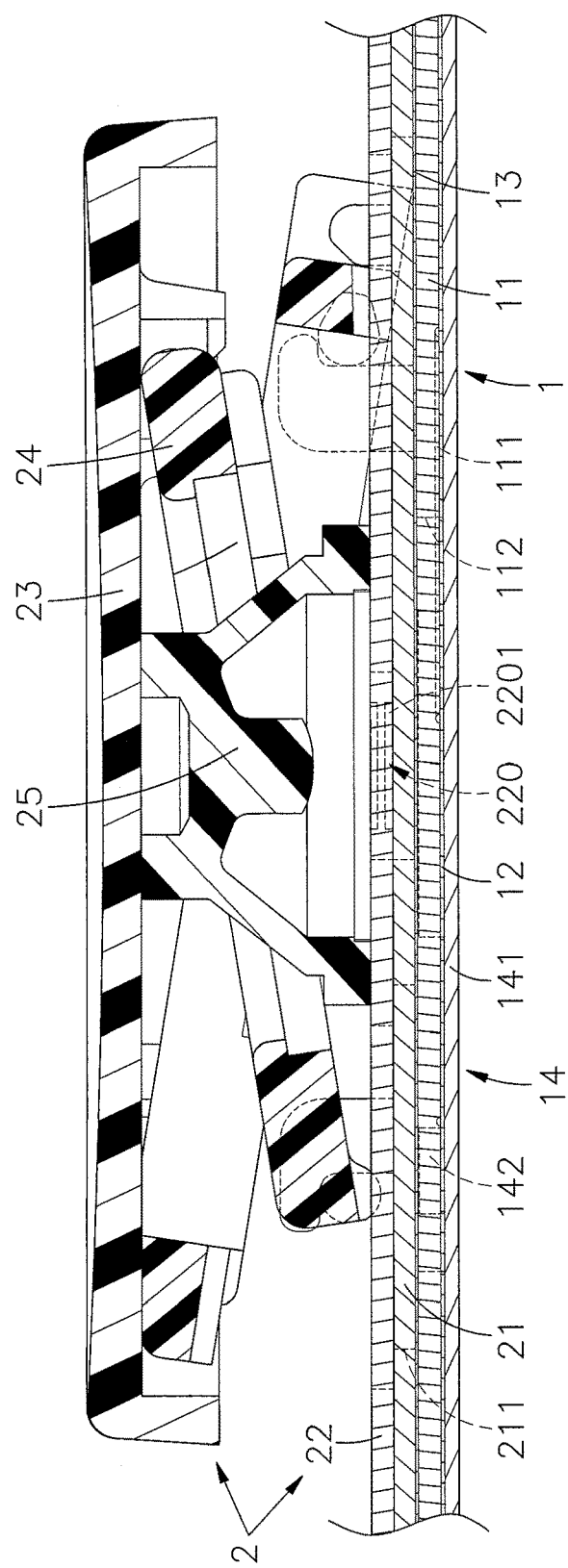
FIG. 7 is a sectional side view, in an enlarged scale, of the light-emitting keyboard in accordance with the present invention.

Referring to FIGS. 5-7, the backlight module 1 of the present invention can be used in a light-emitting keyboard. As illustrated, the light-emitting keyboard comprises the above-described backlight module 1 and the key switch unit 2. The backlight module 1 further comprises a reflective sheet 12, a shading sheet 13, and a light source module 14. The light source module 14 comprises a flexible circuit board 141, and at least one light-emitting device 142 mounted on the flexible circuit board 141. The reflective sheet 12 is mounted on the reflective surface 11a of the light guide plate 11. The shading sheet 13 is mounted on the light-emitting surface 11b of the light guide plate 11. The light guide plate 11 has at least one slot 112. The reflective sheet 12 has at least one through hole 121 respectively disposed corresponding to the at least one slot 112. The shading sheet 13 comprises a light-blocking portion 131 located on a surface thereof facing toward a corresponding surface area of the light guide plate 11 around the reflecting portion 111. The flexible circuit board 141 of the light source module 14 is disposed adjacent to the light guide plate 11 with the each light-emitting device 142 thereof inserted through the through hole 121 of the reflective sheet 12 into the slot 112 of the light guide plate 11 for emitting light into the light guide plate 11.

In this embodiment, the key switch unit 2 is mounted on the backlight module 1 at a top side, comprising a bottom plate 21, a membrane circuit board 22, a key cap 23, a coupling device 24, and a rubber dome 25. The bottom plate 21 comprises at least one broken hole 211 facing toward the key cap 23. The membrane circuit board 22 can be mounted between the bottom plate 21 and the key cap 23. However, this mounting arrangement is not a limitation. In actual application, the membrane circuit board 22 can be mounted beneath the bottom plate 21. Further, the membrane circuit board 22 comprises a membrane switch 220 embedded therein. The membrane switch 220 comprises positive and negative electrode contacts 2201 that can be respectively arranged on opposing top and bottom circuit layers, or on one same circuit layer. The membrane circuit board 22 further comprises at least one opening 221 corresponding to the broken hole 211 of the bottom plate 21 for the passing of integrated hooks that extend from border edges of the broken hole 211 of the bottom plate 21. The he key cap 23 is coupled to the bottom plate 21 by the coupling device 24. The coupling device 24 is a scissor linkage consisting of an inner frame and an outer frame. The inner and outer frames of the coupling device 24 have respective one ends thereof respectively pivotally connected to the integrated hooks of the bottom plate 21, and respective opposite ends thereof respectively pivotally connected to the key cap 23. Thus, subject to the functioning of the scissor linkage of the coupling device 24, the key cap 23 can be moved up and down relative to the bottom plate 21. Further, the rubber dome 25 is mounted between the membrane circuit board 22 and the key cap 23.

Thus, when the user presses the key cap 23, the key cap 23 is forced to move the coupling device 24 downwardly toward the bottom plate 21 and to simultaneously compress the rubber dome 25 against the membrane circuit board 22, conducting the positive and negative electrode contacts 2201. When the positive and negative electrode contacts 2201 are electrically conducted, the membrane switch 220 is triggered to output a triggering signal corresponding to the character symbol of the key cap 23 to a controller. On the contrary, when the user releases the hand from the key cap 23, the rubber dome 25 immediately imparts an elastic restoring force to push the key cap 23 upwardly back to its previous position, carrying the coupling device 24 upwardly away from the bottom plate 21, and thus, the positive and negative electrode contacts 2201 of the membrane switch 220 are disconducted, completing one switching cycle of the key switch unit 2.

When the light-emitting device 142 of the light source module 14 is electrically conducted to emit light, the emitted light is projected into the slot 112 of the light guide plate 11, and then distributed in the light guide plate 11, and the reflective sheet 12 reflects the light going out of the reflective surface 11a of the light guide plate 11 back to the inside of the light guide plate 11, enabling the light to be guided upwardly out of the light-emitting surface 11b of the light guide plate 11 through the light transmissive area of the shading sheet 13 and the broken hole 211 of the key switch unit 2 toward the key cap 23. The arrangement of the light-blocking portion 131 can avoid bright obscure caused by interference of external light, so that the brightness of the light-emitting surface 11b of the light guide plate 11 can be uniform.

Figure 8:
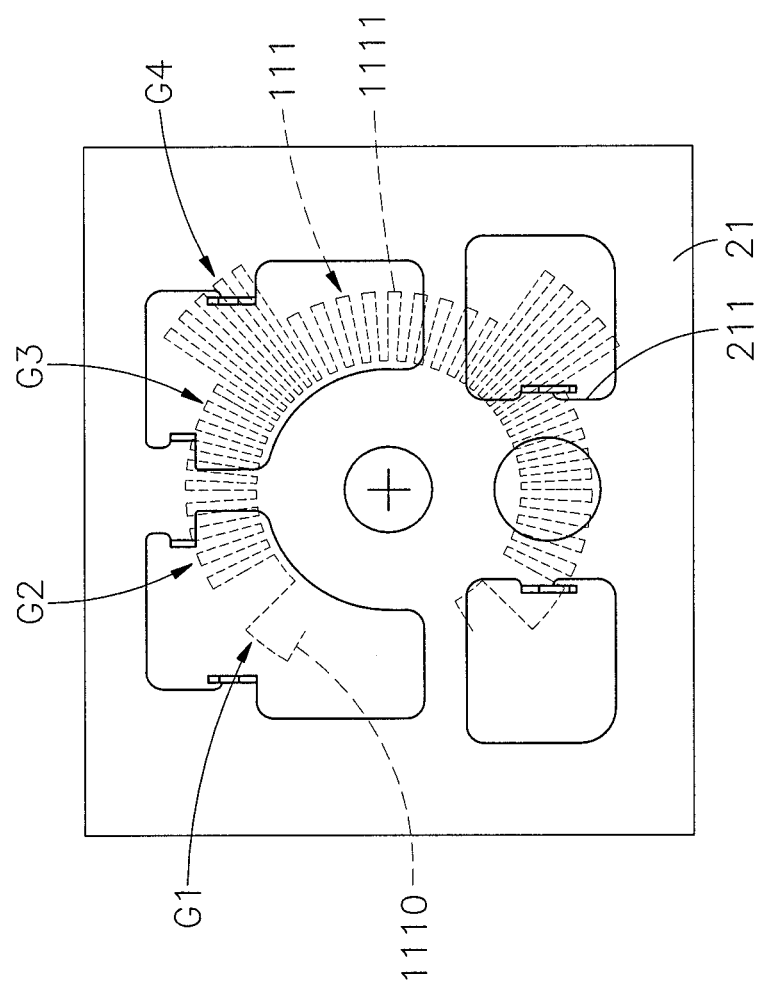
FIG. 8 is a schematic top view illustrating the configuration of the reflecting portion of the light guide plate and positioning relationship between the light guide plate and the bottom plate.
Figure 9:
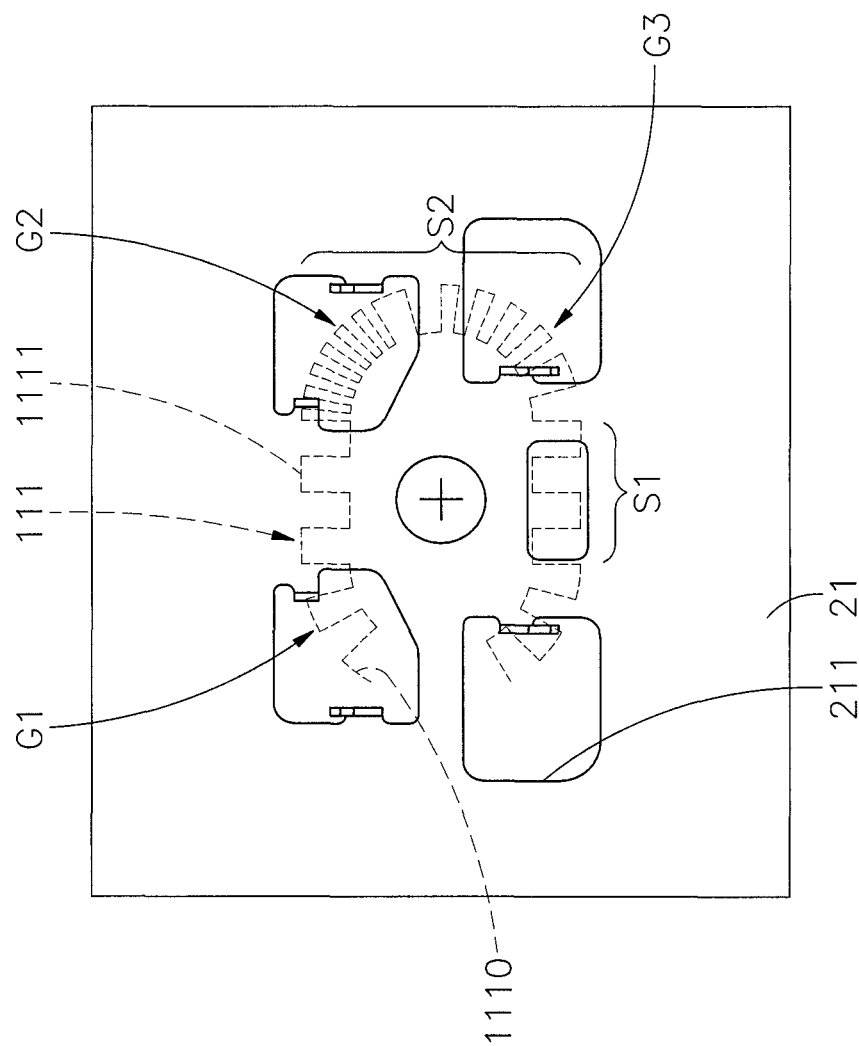
FIG. 9 is a schematic top view of an alternate form of the present invention, illustrating the configuration of another design of the reflecting portion of the light guide plate and positioning relationship between the light guide plate and the bottom plate.
Figure 10:
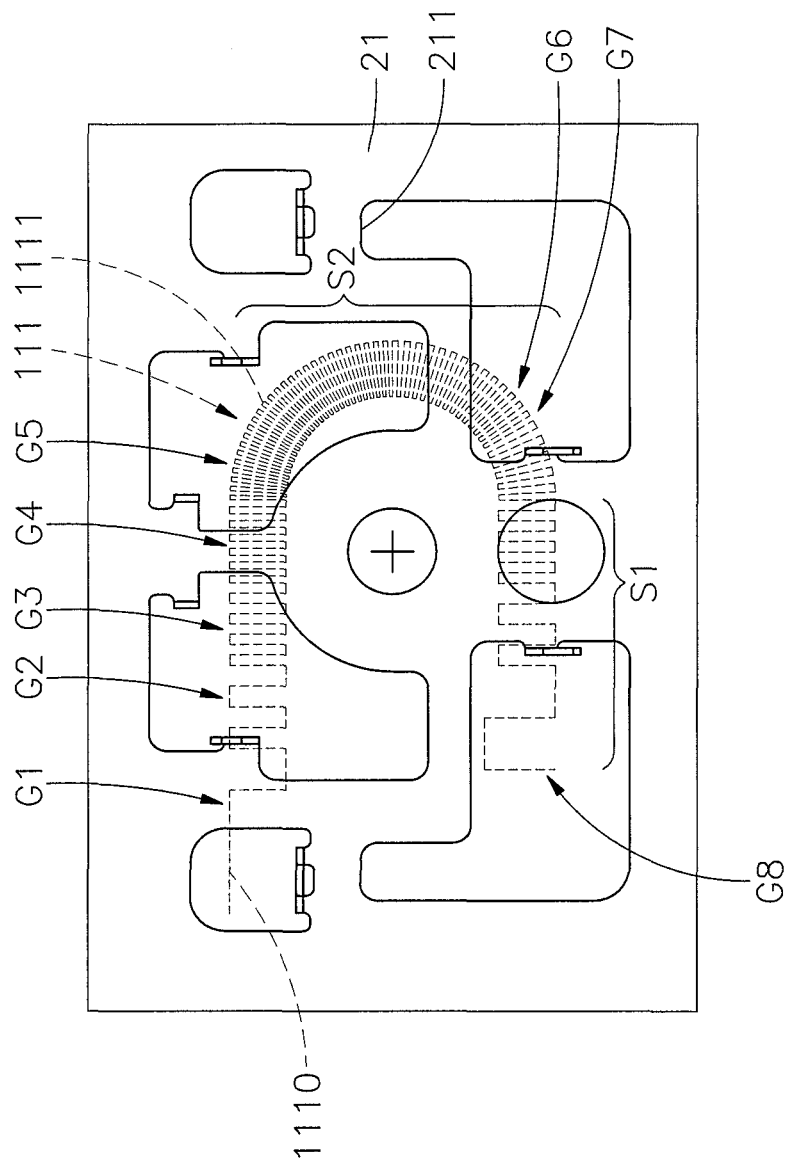
FIG. 10 is a schematic top view of another alternate form of the present invention, illustrating the configuration of still another design of the reflecting portion of the light guide plate and positioning relationship between the light guide plate and the bottom plate.
Figure 11:
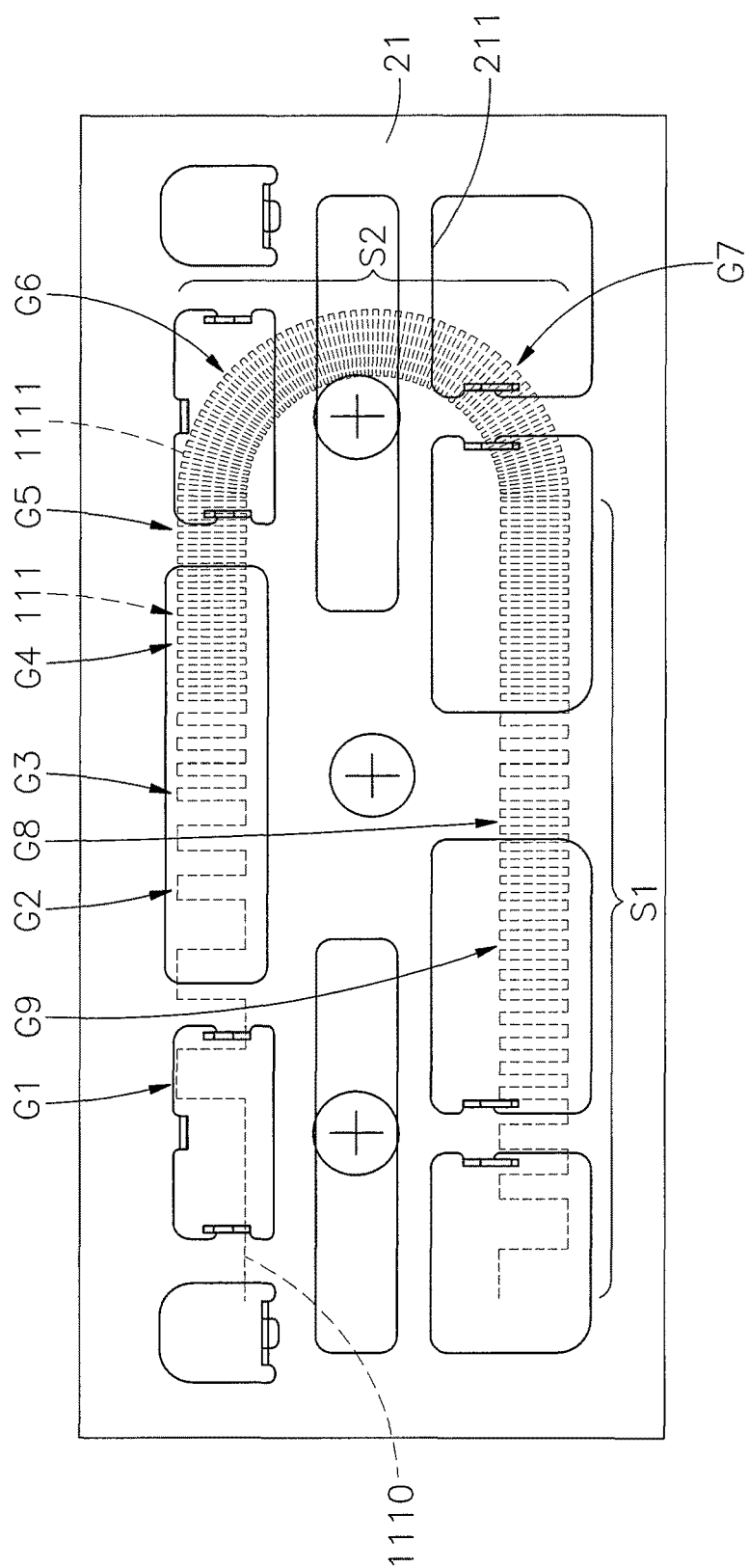
FIG. 11 is a schematic top view of still another alternate form of the present invention, illustrating the configuration of still another design of the reflecting portion of the light guide plate and positioning relationship between the light guide plate and the bottom plate.
Figure 12:
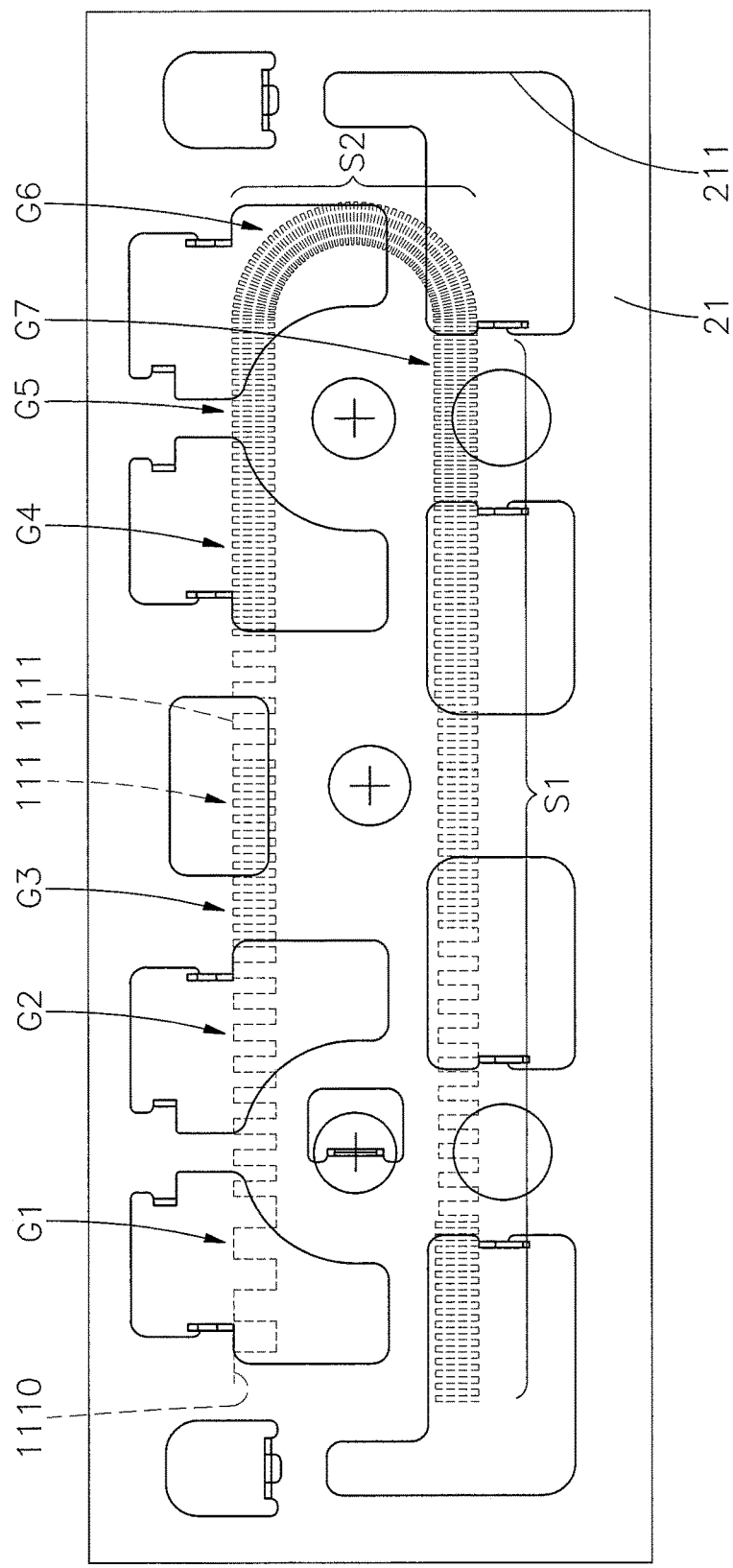
FIG. 12 is a schematic top view of a yet further alternate form of the present invention, illustrating the configuration of a further design of the reflecting portion of the light guide plate and positioning relationship between the light guide plate and the bottom plate.

Please refer to FIGS. 8-12, where FIG. 8 is a schematic top view illustrating the configuration of the reflecting portion of the light guide plate and the positioning relationship between the light guide plate and the bottom plate; FIG. 9 is a schematic top view of an alternate form of the present invention, illustrating the configuration of another design of the reflecting portion of the light guide plate and the positioning relationship between the light guide plate and the bottom plate; FIG. 10 is a schematic top view of another alternate form of the present invention, illustrating the configuration of still another design of the reflecting portion of the light guide plate and the positioning relationship between the light guide plate and the bottom plate; FIG. 11 is a schematic top view of still another alternate form of the present invention, illustrating the configuration of still another design of the reflecting portion of the light guide plate and the positioning relationship between the light guide plate and the bottom plate; FIG. 12 is a schematic top view of a yet further alternate form of the present invention, illustrating the configuration of a further design of the reflecting portion of the light guide plate and the positioning relationship between the light guide plate and the bottom plate. As illustrated, the optical path of the configuration of continuous series of waves of the reflecting portion 111 of the light guide plate 11 beneath the bottom plate 21 is indicated by imaginary lines. The configuration of continuous series of waves of the reflecting portion 111 is the continuous ring-shaped pattern 1111 defining at least one opening 1110. The continuous ring-shaped pattern 1111 comprises at least two straight wave segments S1 spaced from one another at a predetermined pitch, and a turning wave segment S2 connected between respective one ends of each two adjacent straight wave segments S1. Each turning wave segment S2 has a predetermined radius of gyration. The turning wave segments S2 of the waves of the series of waves of the continuous ring-shaped pattern 1111 consists of different cycle waveforms having varying cycle periods, amplitudes or peak-to-peak values that are interleaved in a regular or irregular manner.

In this embodiment, the optical path of the continuous wave-like reflecting portion 111 exhibits the continuous ring-shaped pattern 1111 formed of a series of waves and defining at least one opening 1110. Preferably, the continuous wave-like reflecting portion 111 exhibits the continuous ring-shaped pattern 1111 formed of a series of square waves. By means of pulse width modulation, the straight wave segments S1 and turning wave segments S2 of the waves of the series of waves of the continuous ring-shaped pattern 1111 can be configured to have different cycle periods so that the width and number of the pulse wave duty cycles can be changed according to the size of the waveform. Further, the optical path of the continuous waveform of the straight wave segments S1 and turning wave segments S2 of the continuous ring-shaped pattern 1111 mates with the arrangement of the at least one broken hole 211 of the bottom plate 21. Thus, the equivalent length of the optical path of the continuous ring-shaped pattern 1111 of the reflecting portion 111 can be changed subject to the distance from the light guide plate 11 to the light source module 14, enabling the equivalent length of the optical path in the area of the continuous ring-shaped pattern 1111 that is disposed near the light source module 14 to be shorter than the equivalent length of the optical path in the area of the continuous ring-shaped pattern 1111 that is disposed far from the light source module 14. Thus, the continuous ring-shaped pattern 1111 can change the light path, enabling the light guide plate 11 to concentrate the light and to guide the light toward the key cap 23 of the key switch unit 2, so that the brightness at the area of the light guide plate 11 far from the light source module 14 can be enhanced, enhancing uniform distribution of the brightness of the light-emitting surface 11a of the light guide plate 11 and improving the luminous effect of the light-emitting surface 11b of the backlight module 1.

In the embodiment shown in FIG. 8, the reflecting portion 111 exhibits a light path of the continuous ring-shaped pattern 1111 that is a complex wave formed of a series of waves, defining at least one opening 1110. The continuous ring-shaped pattern 1111 of the reflecting portion 111 consists of four waveform groups G1~G4 that have different frequencies, wherein the amplitude or peak-to-peak value of the fourth waveform group G4 is larger than amplitudes or peak-to-peak values of the other waveform groups G1~G3. By means of adjusting the amplitude or peak-to-peak value of the continuous ring-shaped pattern 1111 of the reflecting portion 111, the border area of the reflecting portion 111 can be controlled to emit light, for example, the four corners of the key cap 23 can be illuminated. Thus, the amplitude or peak-to-peak value of the continuous ring-shaped pattern 1111 can be adjusted to mate with the arrangement of the at least one broken hole 211 of the bottom plate 21. By means of adjusting the frequency to relatively adjust the equivalent for enabling the reflecting portion 111 of the light guide plate 11 to mate with the location and number of the broken hole 211 at least one of the bottom plate 21, the optical extraction strength is effectively enhanced to increase the brightness. Thus, the invention provides the advantages of improving the productivity and reducing the manufacturing cost.

The reflecting portion 111 shown in FIG. 9 is substantially similar to the reflecting portion 111 shown in FIG. 8 with the exception that the continuous ring-shaped pattern 1111 of the reflecting portion 111 shown in FIG. 9 further comprises at least two straight wave segments S1, and the turning wave segment S2 connected between respective one ends of each two adjacent straight wave segments S1. Each turning wave segment S2 has a predetermined radius of gyration. The turning wave segments S2 of the waves of the series of waves of the continuous ring-shaped pattern 1111 consists of three waveform groups G1~G3 that have different frequencies with the same amplitude or peak-to-peak value.

The reflecting portion 111 shown in FIG. 10 and the reflecting portion 111 shown in FIG. 9 commonly exhibit the continuous ring-shaped pattern 1111 that is a complex wave formed of a series of waves and arranged to exhibit a C-shaped, curved, arched, U-shaped, continuous U-shaped, S-shaped or continuous S-shaped profile and defining at least one opening 1110. The continuous ring-shaped pattern 1111 of the reflecting portion 111 shown in FIG. 9 exhibits a C-shaped profile. The continuous ring-shaped pattern 1111 of the reflecting portion 111 shown in FIG. 10 exhibits a U-shaped profile. The straight wave segments S1 and the turning wave segments S2 of the continuous ring-shaped pattern 1111 consist of eight waveform groups G1-G8 that have different frequencies and different cycle periods, wherein the amplitude or peak-to-peak value of the eighth waveform group G8 is larger than amplitudes or peak-to-peak values of the other waveform groups G1~G7.

The reflecting portions 111 shown in FIGS. 11 and 12 are substantially similar to the reflecting portions 111 shown in FIGS. 8-10 with the exception that the optical paths of the continuous ring-shaped patterns 1111 shown in FIGS. 11 and 12 respectively go through the multiple broken holes 211 of the bottom plate 21 toward the multiple key caps 23; the straight wave segments S1 and the turning wave segments S2 of the continuous ring-shaped patterns 1111 shown in FIGS. 11 and 12 respectively consist of the multiple wave groups G1~G9, G1~G7 that have different frequencies and different cycle periods. By means of adjusting the frequencies or cycle periods of the multiple wave groups G1~G9, G1~G7, the waveform density and equivalent length are relatively adjusted. As illustrated, the continuous waveform of the first (upper) row of the straight wave segments S1 is arranged from left to right: most sparse, more sparse, sparse, dense, more dense; the continuous waveform of the turning wave segments S2 is arranged from top to bottom: most dense, more dense, dense; the continuous waveform of the second (lower) row of the straight wave segments S1 is arranged from right to left: dense, sparse, dense, more dense, most sparse. In actual application, the arrangement of all the equivalent lengths can be adjusted to improve the optical extraction rate of the reflecting portion 111, enabling the brightness of the light guide plate 11 to be uniformly distributed.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A backlight module for light-emitting keyboard, comprising a light guide plate, said light guide plate comprising a reflective surface, a light-emitting surface opposite to said reflective surface, and a plurality of recessed dots located on said reflective surface to create an optical path of a continuous wave-like reflecting portion for facing toward a key switch unit in said light-emitting keyboard, wherein said continuous wave-like reflecting portion exhibits a continuous ring-shaped pattern formed of a series of ring-shaped square waves, triangular waves, sawtooth waves or sine waves.

2. The backlight module for light-emitting keyboard as claimed in claim 1, wherein the spacing between the centers of each two adjacent said recessed dots is smaller than or equal to the diameter of one single said recessed dot.

3. The backlight module for light-emitting keyboard as claimed in claim 1, wherein said continuous ring-shaped pattern consists of at least one different cycle waveforms having varying cycle periods, amplitudes or peak-to-peak values that are interleaved in a regular or irregular manner.

4. The backlight module for light-emitting keyboard as claimed in claim 1, wherein said continuous wave-like reflecting portion exhibits a continuous ring-shaped pattern formed of a series of waves and defining at least one opening, each said wave comprising at least two straight wave segments spaced from one another at a predetermined pitch, a turning wave segment connected between respective one ends of each two adjacent said straight wave segments, each said turning wave segment having a predetermined radius of gyration, the said turning wave segments of the said waves of the said series of waves of the said continuous ring-shaped pattern consisting of at least one different cycle waveforms having varying cycle periods, amplitudes or peak-to-peak values that are interleaved in a regular or irregular manner.

5. A light-emitting keyboard, comprising a backlight module and a key switch unit, wherein:

said backlight module comprising a light guide plate, a reflective sheet, a shading sheet, and a light source module, said light guide plate comprising a reflective surface, a light-emitting surface opposite to said reflective surface, and a plurality of recessed dots located on said reflective surface to create an optical path of a continuous wave-like reflecting portion for facing toward said key switch unit in said light-emitting keyboard, wherein said continuous wave-like reflecting portion exhibits a continuous ring-shaped pattern formed of a series of ring-shaped square waves, triangular waves, sawtooth waves or sine waves; said reflective sheet mounted on said reflective surface of said light guide plate, said shading sheet mounted on said light-emitting surface of said light guide plate, and said light source module disposed adjacent to said light guide plate and adapted for emitting light into said light guide plate;

said key switch unit is mounted on said backlight module, comprising a bottom plate, a membrane circuit board, a key cap and a coupling device, said bottom plate comprising at least one broken hole facing toward said key cap, said membrane circuit board being mounted between said bottom plate and said key cap, said coupling device being coupled between said key cap and said bottom plate and adapted for moving said key cap up and down relative to said bottom plate, said reflecting portion being adapted for reflecting light from said backlight module through said broken hole toward said key cap.

6. The light-emitting keyboard as claimed in claim 5, wherein the spacing between the centers of each two adjacent said recessed dots is smaller than or equal to the diameter of one single said recessed dot.

7. The light-emitting keyboard as claimed in claim 5, wherein said continuous ring-shaped pattern consists of at least one different cycle waveforms having varying cycle periods, amplitudes or peak-to-peak values that are interleaved in a regular or irregular manner.

8. The light-emitting keyboard as claimed in claim 5, wherein said continuous wave-like reflecting portion exhibits a continuous ring-shaped pattern formed of a series of waves and defining at least one opening, each said wave comprising at least two straight wave segments spaced from one another at a predetermined pitch, a turning wave segment connected between respective one ends of each two adjacent said straight wave segments, each said turning wave segment having a predetermined radius of gyration, the said turning wave segments of the said waves of the said series of waves of the said continuous ring-shaped pattern consisting of at least one different cycle waveforms having varying cycle periods, amplitudes or peak-to-peak values that are interleaved in a regular or irregular manner.

9. The light-emitting keyboard as claimed in claim 5, wherein said light guide plate comprises at least one slot; said reflective sheet comprises at least one through hole corresponding to said at least one slot of said light guide plate; said light source module comprises a flexible circuit board and at least one light-emitting device mounted on said flexible circuit board and inserted through said through hole into said at slot.

10. The light-emitting keyboard as claimed in claim 5, wherein said membrane circuit board comprises a membrane switch corresponding to said key cap; said key switch unit further comprises a rubber dome mounted between said membrane switch and said key cap and compressible by said key cap to trigger said membrane switch.

\* \* \* \* \*